Sept. 11, 1934.  J. B. MURGATROYD  1,973,501
STRENGTHENING GLASSWARE BY SURFACE TREATMENT
Filed Feb. 24, 1931  2 Sheets-Sheet 1
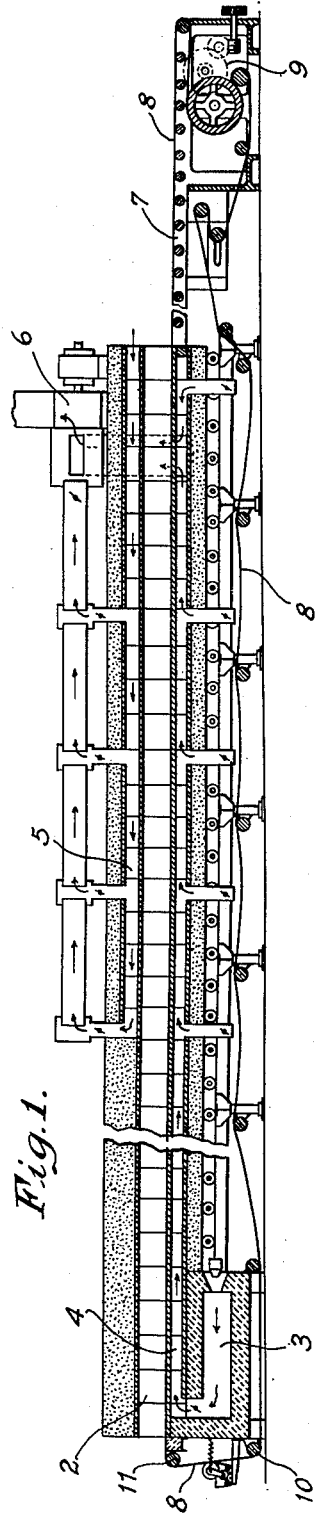
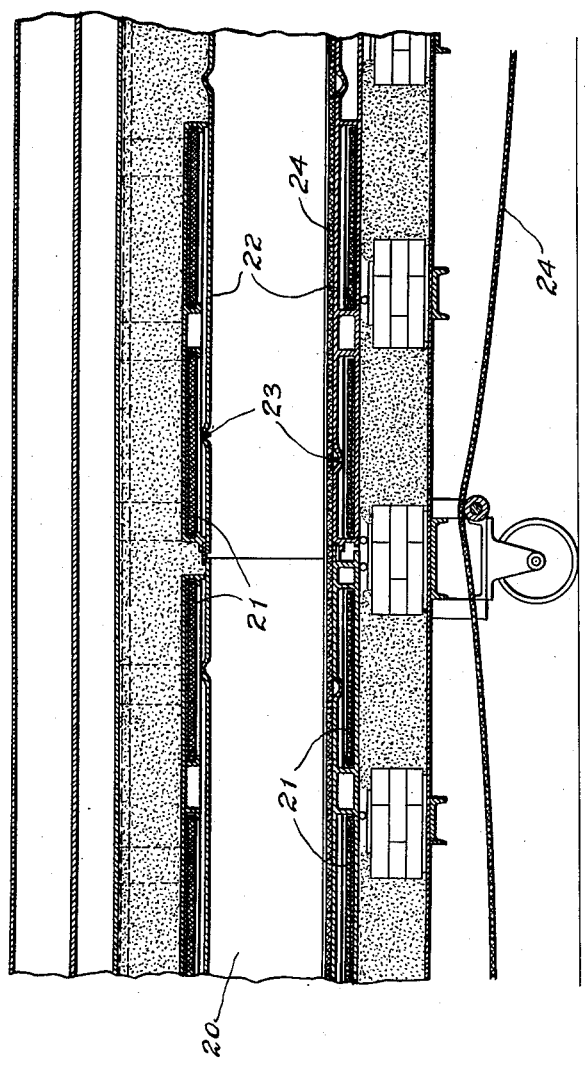
*Inventor*
John B. Murgatroyd
by Brown & Parham
*Attorneys.*

Sept. 11, 1934.  J. B. MURGATROYD  1,973,501
STRENGTHENING GLASSWARE BY SURFACE TREATMENT
Filed Feb. 24, 1931   2 Sheets-Sheet 2
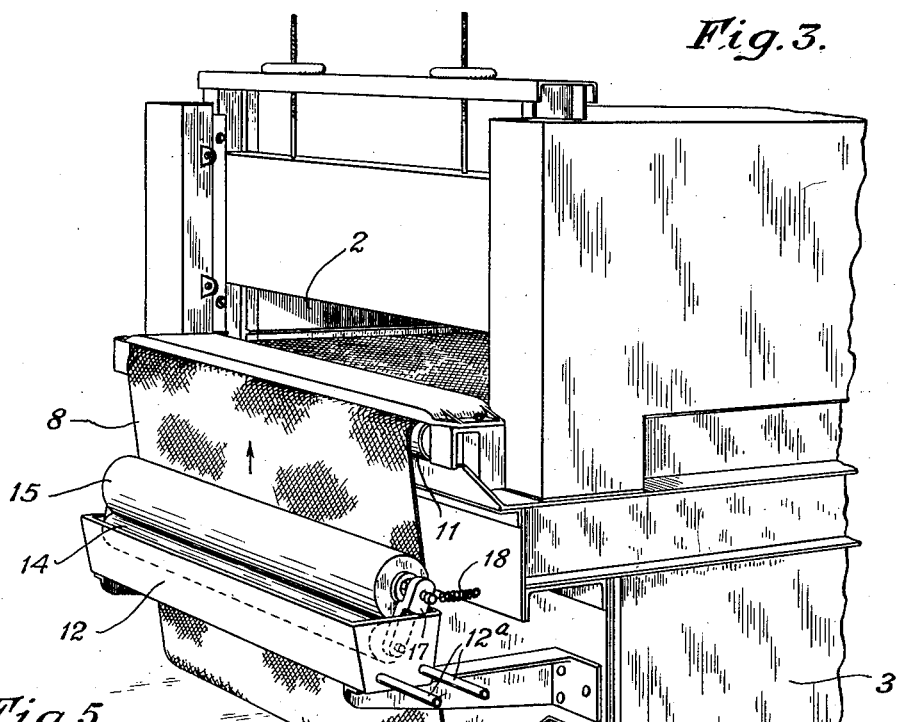
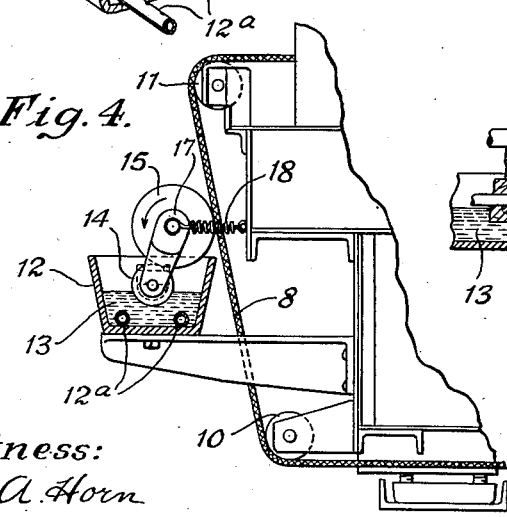
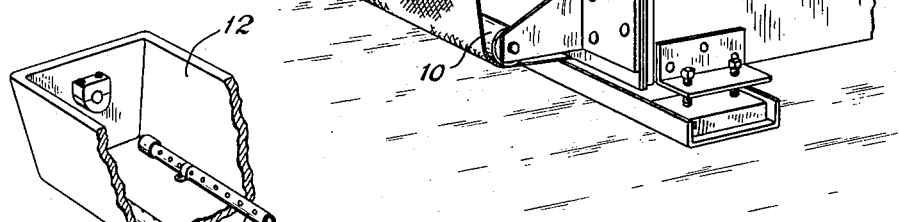
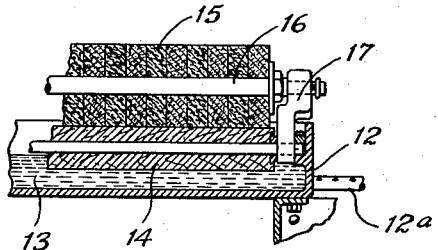
Inventor
John B. Murgatroyd
by Brown & Parham
Attorneys.
Witness:
A. A. Horn Patented Sept. 11, 1934

1,973,501

UNITED STATES PATENT OFFICE 1,973,501

STRENGTHENING GLASSWARE BY SURFACE TREATMENT

John Blackburn Murgatroyd, London, England, assignor to Hartford-Empire Company, Hartford, Conn., a corporation of Delaware Application February 24, 1931, Serial No. 517,662
In Great Britain September 25, 1930

1 Claim. (Cl. 49—14)

This invention relates to the surface treatment of glassware for the purpose of increasing its strength, particularly its resistance to thermal shocks.

The invention is based upon the discovery that the strength of hollow glassware such as bottles, jars and pressed articles, may be materially increased by subjecting the ware, while at or somewhat below its softening temperature, to the action of sulphurous fumes produced by introducing sulphur into a hot enclosure, such as an annealing lehr, containing the glassware to be treated.

The sulphurous fumes may be applied to the glass by passing the glass, while carried by a conveyor, through the lehr tunnel or other enclosure in which the glass is brought to or maintained at a temperature within about 100° C. of its softening point, and applying sulphur to the conveyor in small and uniform amounts, the sulphur being suitably suspended in a liquid, such as mineral oil. The liquid mixture of sulphur and oil or other vehicle may be applied to the conveyor by brushing, spraying or, more conveniently, by a roller device which will be described below.

An ordinary annealing lehr, in which the glass is carried through a tunnel by means of a conveyor composed of woven wire fabric or metallic slats, affords a suitable environment for carrying this invention into effect. Examples of such arrangements are shown in the accompanying drawings, in which:

Figure 1 is a diagrammatic vertical longitudinal sectional view of a lehr of a well-known fuel-fired muffle type, equipped to carry out the present invention by applying a sulphur-containing liquid to the lehr conveyor just before the conveyor enters the lehr tunnel;

Fig. 2 is a fragmentary vertical longitudinal sectional view of an electrically heated lehr to which the present invention is applicable;

Fig. 3 is a perspective view of the front or ware-receiving end of the lehr of Fig. 1, showing the manner in which the coating device is mounted to coat the conveyor belt of the lehr;

Fig. 4 is a side view, partly in elevation and partly in section, of the lower part of the structure shown in Fig. 3;

Fig. 5 is a fragmentary perspective view showing parts of the trough and the agitating pipes of the coating device; and Fig. 6 is a fragmentary sectional view taken axially through the rollers of the coating device.

The lehr shown in Figs. 1 and 3 of the drawings comprises a sectional tunnel 2; a fire box 3 located beneath the forward or ware-receiving end of the tunnel; a plurality of heating flues 4 communicating with the fire box 3 and extending longitudinally beneath the tunnel; a plurality of cooling flues 5 extending longitudinally above the tunnel; a suction fan 6 located above the exit end of the tunnel and communicating with both the heating flues and the cooling flues; a ware-sorting table 7 located at the exit end of the tunnel; an endless conveyor 8 of open-work or wire mesh fabric, the ware-bearing strand of which traverses the sorting table 7, and the idle strand of which returns to the entrance end of the tunnel beneath the lehr; and a conveyor driving mechanism 9, together with manual or automatic means for controlling the temperatures in the successive zones of the lehr tunnel. This lehr is shown and described in more detail in the U. S. Mulholland Patent No. 1,560,481 and in British Patent No. 250,201.

As the conveyor 8 approaches the inlet of the tunnel 2, at the left of Fig. 1, it passes over rollers 10 and 11. The present invention may be practiced, as shown, by means of a coating device located adjacent to that portion of the conveyor 8 which runs between the rollers 10 and 11.

The coating device is best shown in Figs. 3 to 6. It comprises a trough 12, for containing a supply 13 of treating liquid such as the sulphur-oil mixture already referred to, a loosely mounted roller 14 dipping into the liquid in the trough 12, and a second loosely mounted roller 15 engaging the roller 13 and also engaging, and driven by, the conveyor belt 8. The dipping roller 14 preferably has a smooth surface so as to take up only a small quantity of liquid as it rotates, and it may be made of metal, wood or other suitable material. Wood has been found to be the most satisfactory material for this roller, as it takes up about the proper amount of liquid. The roller 15, however, should have a softer and more absorbent surface. It may consist, as shown, of disks of felt, carried by a spindle 16. Perforated pipes 12a may be introduced into the sulphur-oil mixture to permit introduction of air to agitate the mixture.

The rollers 14 and 15 are mounted on any convenient supports, such as the members 17, and a spring 18 or other means may be provided to press the felt roller 15 against the conveyor belt 8 sufficiently to cause the movement of the belt to rotate the roller.

The liquid coating material may consist of light lubricating oil containing as much sulphur as can be conveniently kept in suspension in the oil. The proportions of oil and sulphur are not critical, the only requirement being that the sulphur be applied to the lehr conveyor without being accompanied by so much oil as to produce an undesirable deposit of oil film upon the glassware in the lehr. The oil or other liquid that may be employed acts merely as a carrier for the sulphur, which is the active strengthening agent.

This treatment has a distinctly strengthening effect upon the glassware. Glass bottles treated in this manner are found to have greatly increased resistance to thermal shock and to impact, and to have as much as 30% greater strength, by the usual hydrostatic test, than similar bottles annealed in the same manner, but without the sulphur treatment.

In Fig. 2 of the drawings, another form of lehr is shown wherein a tunnel 20 is heated by means of electrical heating elements 21 which may be located within the tunnel or may, as shown, be separated from the tunnel by metal plates 22. Pyrometers 23 and the usual control devices are provided for indicating and regulating the temperatures in the tunnel 20. A conveyor belt 24, similar to the belt 8 of the other figures, may convey the glassware through the tunnel, and a sulphur-applying device may be used, as in the device of the other figures, for introducing sulphur into the lehr tunnel.

Instead of treating the glassware in a lehr, the sulphur treatment may be applied to the glassware while upon the "buck" or conveyor which is ordinarily used to carry the ware from the fabricating machine to the lehr, in which case the "buck" should be covered so as to confine the sulphurous fumes, and additional heat may be supplied if the heat of the glassware itself is not sufficient to produce the necessary fumes.

The present invention is not restricted to any particular type of lehr or other enclosure for treating the glassware and the means employed for introducing sulphur into the treating chamber is independent of the means for heating the treating chamber. It will also be noted that when a lehr is employed as the heating chamber, the action of the sulphur or other treating agent is independent of the control of the annealing temperatures, which control proceeds as usual and is not interfered with by the treating agent, as would be the case if the sulphur or other treating agent were to be introduced into the lehr tunnel by means of flame.

Certain of the appended claims refer to the treating agent as "fumes" or "sulphurous fumes". These expressions are to be understood as meaning, in the case of sulphur, the gases or vaporous products resulting from the introduction of elemental sulphur into a chamber heated to a temperature of the order of the annealing temperature of glassware. Such fumes may contain either oxides of sulphur, sublimed sulphur, or both. The term "fumes" is to be understood as including the "sulphurous fumes" just referred to, and also any acid oxide or other agent which has an effect on glassware, in the circumstances stated, the same or similar to the action of sulphurous fumes. When sulphur is used as the treating agent, it may be applied in the form of sulphur dioxid, but this is less convenient than applying it as elemental sulphur, because of the difficulty of obtaining sufficient concentration of the sulphur dioxid gas and the discomfort to workmen occasioned by the presence of sulphur dioxid in considerable quantity in the factory.

The precise manner in which the sulphur or other treating agent acts to strengthen the glass has not yet been fully determined. It is considered probable that the sulphurous fumes act by entering the very minute fissures which exist at the surface of all glass objects and enter into combination either with soda or with other constituents of the glass and thereby tend to correct the otherwise harmful effect of these surface fissures, with the result that the resistance of the glass to strains and shocks is substantially increased. The action may be a rounding of the fissures, which thus reduces stress concentration when the glass surface is subjected to stresses.

A possible explanation for the results obtained by the practice of my invention which is strongly supported by actual tests is that elemental sulphur introduced into the lehr as aforesaid, or in any other desired manner, burns within the lehr and probably closely adjacent to the surface of the glass articles to form oxidation products, including sulphur dioxide and sulphur trioxide. These products react with the soda on or close to the surface of the glass, to form sodium sulphite or sodium sulphate, which melt on the surface and actually melt with a fluxing action slightly into the glass. This results in a rounding of the minute flaws existing on the glass surface due to a fluxing action of the products of the chemical reactions. The flaws are thereby rounded to some extent so that their radii of curvature where they penetrate the glass is increased. Thus, under tension the stress concentration at a flaw is not so great as when this radius of curvature is small.

The action on the surface of the glass is probably similar to the action of catalysis as far as such action is understood, especially the "adsorption theory" of catalysis. That is, that there exists on the surface of solid bodies a film which is relatively thin and in which various chemical reactions may take place with the materials reacting in the same manner as would take place if such materials were present in extremely high concentrations and pressures. Under these circumstances chemical reactions will take place which do not take place at any distance from solid surfaces or at lower concentrations.

For these reasons, and possibly others, it has been found that the supplying of gaseous sulphur dioxide to a lehr in any concentrations obtainable in practice is inadequate to produce the results desired and actually obtained according to my present invention, in that it is impossible to obtain and maintain the gas at the necessary concentrations in order that the surface reactions will take place, such as are obtained in practice by the use of elemental sulphur.

It is probable, for example, that the sulphur applied to the lehr belt as aforesaid is to a material extent sublimed, this sublimed sulphur coming into contact with the surfaces of the glass articles and there being oxidized and combined with the soda as aforesaid due to the adsorption of the sublimed sulphur and the relatively high concentration of sulphur oxides, either sulphur dioxide or sulphur trioxide, or both, right at the surface of the glass which is being treated.

Variations in the process and in the apparatus herein disclosed may be made within the scope of the appended claim.

I claim:

Apparatus for treating glassware, comprising a heating chamber, a conveyor for conveying glassware therethrough, means for heating said chamber, and means for applying a fume-producing agent to said conveyor, comprising a container for holding a treating liquid such as a suspension of sulphur in a liquid vehicle, means for agitating the liquid in said container, a roller arranged to dip into said liquid, and a second roller engaging said first-named roller and provided with a relatively soft surface, said second roller being in contact with, and driven by, said conveyor.

JOHN BLACKBURN MURGATROYD.